US010165172B2

(12) United States Patent
Saito

(10) Patent No.: US 10,165,172 B2
(45) Date of Patent: Dec. 25, 2018

(54) CAMERA SYSTEM AND CONTROL METHOD THEREFOR, AND ELECTRONIC DEVICE AND CONTROL PROGRAM THEREFOR

(71) Applicant: Panasonic Intellectual Property Management Co., Ltd., Osaka (JP)

(72) Inventor: Hiroshi Saito, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 40 days.

(21) Appl. No.: 15/420,576

(22) Filed: Jan. 31, 2017

(65) Prior Publication Data

US 2017/0142323 A1 May 18, 2017

Related U.S. Application Data

(63) Continuation of application No. PCT/JP2016/001245, filed on Mar. 8, 2016.

(30) Foreign Application Priority Data

Mar. 10, 2015 (JP) ................................. 2015-047539

(51) Int. Cl.
*H04N 5/232* (2006.01)
*G03B 15/00* (2006.01)
(Continued)

(52) U.S. Cl.
CPC ........... *H04N 5/23206* (2013.01); *G01S 1/02* (2013.01); *G03B 15/00* (2013.01);
(Continued)

(58) Field of Classification Search
CPC ... H04N 5/23206; G06T 7/70; G06K 9/00771
See application file for complete search history.

(56) References Cited

U.S. PATENT DOCUMENTS

2015/0109457 A1* 4/2015 Stout ...................... H04N 5/222
348/169

FOREIGN PATENT DOCUMENTS

JP  2002-314851  10/2002
JP  2005-130230   5/2005
(Continued)

OTHER PUBLICATIONS

International Search Report of PCT application No. PCT/JP2016/001245 dated Apr. 26, 2016.

*Primary Examiner* — Twyler L Haskins
*Assistant Examiner* — Fayez Bhuyan
(74) *Attorney, Agent, or Firm* — Renner Otto Boisselle & Sklar, LLP

(57) ABSTRACT

A camera system includes a remote camera, a beacon signal transmission apparatus that is disposed at a location corresponding to a preset point and transmits a beacon signal, and an electronic device that receives the beacon signal. One or both of the remote camera and the electronic device include a storage unit, a distance determination section, and a control command generation section. The storage unit stores information regarding the preset point. The distance determination section estimates a distance between the tag device and the beacon signal transmission apparatus, based on a reception intensity of the beacon signal. When the distance estimated by the distance determination section is less than a predetermined value, the control command generation section generates a control command that causes the remote camera to face the preset point, based on information stored in the storage unit.

8 Claims, 12 Drawing Sheets

(51) Int. Cl.
*G06T 1/00* (2006.01)
*G01S 11/06* (2006.01)
*G06T 7/70* (2017.01)
*G06K 9/00* (2006.01)
*G01S 1/02* (2010.01)

(52) U.S. Cl.
CPC ............ *G06K 9/00771* (2013.01); *G06T 7/70* (2017.01); *H04N 5/232* (2013.01); *G01S 11/06* (2013.01); *G03B 2206/00* (2013.01)

(56) References Cited

FOREIGN PATENT DOCUMENTS

| | | |
|---|---|---|
| JP | 2006-338097 | 12/2006 |
| JP | 2007-336035 | 12/2007 |
| JP | 2013-161246 | 8/2013 |
| JP | 2014-225831 | 12/2014 |

\* cited by examiner

CAMERA SYSTEM AND CONTROL METHOD THEREFOR, AND ELECTRONIC DEVICE AND CONTROL PROGRAM THEREFOR

BACKGROUND

1. Technical Field

The present disclosure relates to a camera system and to a method for controlling the camera system. Furthermore, the present disclosure relates to an electronic device, such as a smartphone, that controls the above camera system and to a control program for the electronic device.

2. Description of the Related Art

Patent Literature 1 (Unexamined Japanese Patent Publication No. 2002-314851) discloses attachment of an electronic device having a subject location detector including a GPS (Global Positioning System), for example, to a subject in order to provide an image pickup device tailored to capture an image of the subject in motion.

The image pickup device receives a location of the subject from the electronic device in a wireless manner. Then, based on this subject's location and a location and attitude of the image pickup device detected by itself, the image pickup device calculates a location of a subject's figure with respect to a shooting screen and a distance between the image pickup device and the subject.

The image pickup device displays a mark indicating a location of or a direction to the subject's figure on a finder screen in a superimposing manner, in accordance with the location of the subject's figure with respect to the shooting screen. Moreover, the image pickup device varies locations and sizes of a distance-measuring region and a photometric region, in accordance with the distance between the image pickup device and the subject.

SUMMARY

Unfortunately, the image pickup device in Patent Literature 1 cannot measure a location of a subject inside a room, because this image pickup device makes the measurement by using a GPS to detect a location of the subject in motion. Furthermore, a location detecting precision of the image pickup device depends on that of the GPS. Therefore, when tracking a subject moving within a limited outdoor area, the image pickup device cannot measure a location of the subject with higher precision than that of the GPS.

An object of the present disclosure is to provide a camera system that is capable of capturing an image of a subject moving within a limited indoor or outdoor area by automatically tracking the subject with high precision compared to a conventional art.

According to the present disclosure, a camera system automatically points a remote camera at a subject present at or close to a preset point; the subject possesses an electronic device. This camera system includes: the remote camera; a beacon signal transmission apparatus that is disposed at a location corresponding to the preset point and transmits a beacon signal; and the electronic device that receives the beacon signal. One or both of the remote camera and the electronic device include a storage unit, a distance determination section, and a control command generation section. The storage unit stores information regarding the preset point. The distance determination section estimates a distance between the electronic device and the beacon signal transmission apparatus, based on a reception intensity of the beacon signal. When the distance estimated by the distance determination section is less than a predetermined value, the control command generation section generates a control command that causes the remote camera to face the preset point, based on the information stored in the storage unit.

According to the present disclosure, a camera system is capable of capturing an image of a subject moving within a limited indoor or outdoor area by automatically tracking the subject with high precision compared to a conventional art.

DETAILED DESCRIPTION

Some exemplary embodiments will be described below in detail with appropriate reference to the accompanying drawings. In some cases, excessive details will not be described. For example, details of a matter already known in the art will not be described, and components substantially the same as those already described will not be described again. The reason is to prevent the following description from being needlessly redundant, facilitating an understanding of those skilled in the art.

The inventor of the present disclosure provides the accompanying drawings and the following description for the purpose of helping those skilled in the art sufficiently understand the present disclosure, and therefore the accompanying drawings and the following description are not intended to limit a subject matter described in the claims.

First Exemplary Embodiment

Figure 1:
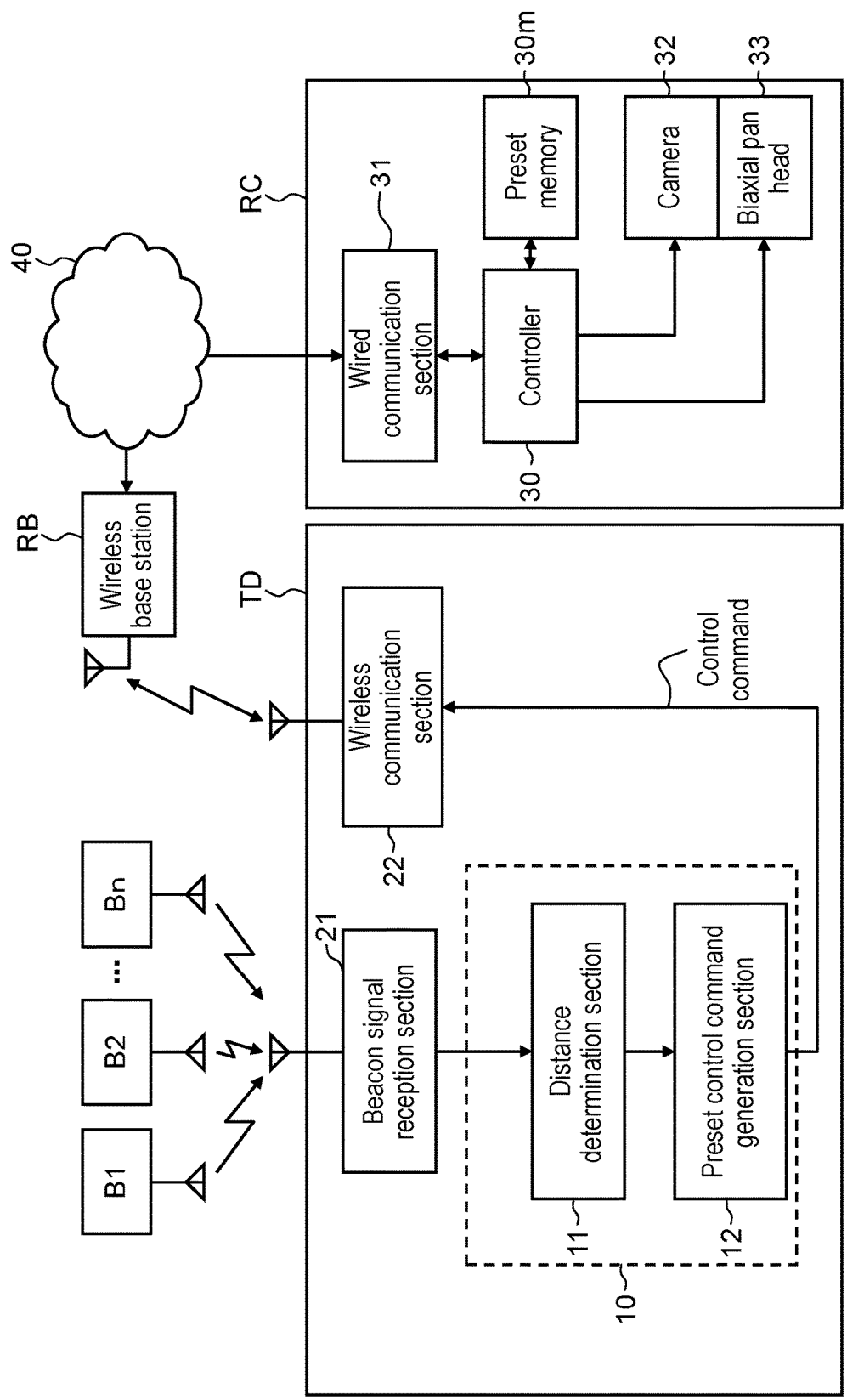
FIG. 1 is a block diagram illustrating a configuration of a camera system according to a first exemplary embodiment.
Figure 2:
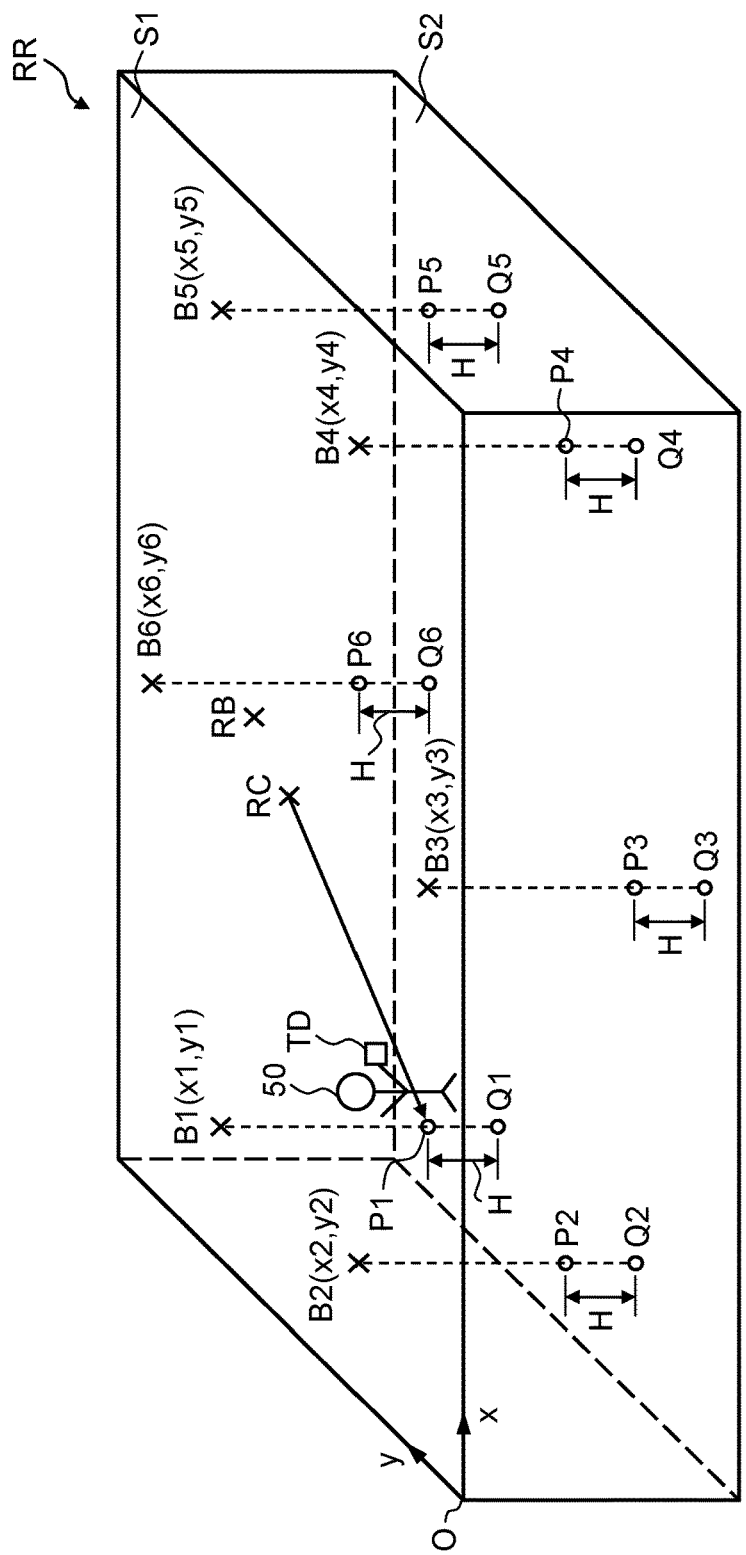
FIG. 2 is a schematic view used to explain the camera system according to the first exemplary embodiment.

FIG. 1 is a block diagram illustrating a configuration of a camera system according to a first exemplary embodiment. FIG. 2 is a schematic view used to explain the camera system according to the first exemplary embodiment.

In FIG. 1 and FIG. 2, a camera system according to the first exemplary embodiment includes beacon signal transmission apparatuses Bn (n=1, 2, . . . , N), tag device TD, remote camera RC, and wireless base station RB.

An N number of beacon signal transmission apparatuses Bn are present (N is an integer of 1 or more). Tag device TD is possessed by subject 50. Remote camera RC captures an image of subject 50. Wireless base station RB is connected to tag device TD via a wireless line, such as a wireless LAN (Local Area Network). In addition, wireless base station RB is also connected to remote camera RC via wired LAN 40 (alternatively, wireless base station RB may be connected to remote camera RC via the above wireless line).

In FIG. 2, there is room RR having a cuboid shape, for example, where remote camera RC and wireless base station RB are installed, for example at the center of ceiling surface S1. Provided on ceiling surface S1 are six beacon signal transmission apparatuses Bn (n=1, 2, . . . , 6) arranged a predetermined distance away from one another. Beacon signal transmission apparatuses Bn are fixed to ceiling surface S1 at locations corresponding to two-dimensional coordinates (xn, yn). Preset floor points Qn (n=1, 2, . . . , 6) are set to locations on floor surface S2 immediately below beacon signal transmission apparatuses Bn. Preset points Pn (n=1, 2, . . . , 6) are set to locations that are height H higher than preset floor points Qn (n=1, 2, . . . , 6) toward beacon signal transmission apparatuses Bn (n=1, 2, . . . , 6). Preset points Pn are locations at which an image of subject 50, such as a human, moving together with tag device TD is to be captured. The two-dimensional coordinates (xn, yn) of preset floor points Qn and preset points Pn are the same as those of corresponding beacon signal transmission apparatuses Bn.

Height H is set to a predetermined height so that an image of subject 50 can be captured. In this exemplary embodiment, when a subject moving together with tag device TD is present at or close to given preset point Pn, the camera system remotely controls remote camera RC to face this preset point Pn. When subject 50 is positioned close to preset point P1, namely, close to beacon signal transmission apparatus B1 as illustrated in FIG. 2, remote camera RC points camera 32 (see FIG. 1) at preset point P1.

Alternatively, preset points Pn may be set to locations on floor surface S2. In other words, height H may be set to zero. In which case, preset floor points Qn and corresponding preset points Pn are set to the same locations. For example if a subject is an animal, such as a dog or a baby, and thus height H is negligible, preset floor points Qn and corresponding preset points Pn may be set to the same locations.

In FIG. 1, tag device TD, which may be a smartphone or other electronic device, for example, includes controller 10, beacon signal reception section 21, and wireless communication section 22. Controller 10 may be a CPU (Central Processing Unit) or other digital computer, for example, and includes distance determination section 11 and preset control command generation section 12 that generates a preset control command as an exemplary control command.

Beacon signal reception section 21 receives beacon signals from beacon signal transmission apparatuses Bn. Distance determination section 11 estimates distances r between tag device TD and beacon signal transmission apparatuses Bn that have transmitted the beacon signals, based on reception intensities of the received beacon signals. Then, distance determination section 11 determines whether the shortest one of estimated distances r is less than predetermined value rth. If the shortest estimated distance r is less than predetermined value rth, preset control command generation section 12 determines that subject 50 (see FIG. 2) having tag device TD is present close to preset point (xn, yn) at which distance r has the lowest value. Then, preset control command generation section 12 generates a control command that causes camera 32 of remote camera RC to face preset point Pn (see FIG. 2) corresponding to beacon signal transmission apparatus Bn having the lowest distance r value. Wireless communication section 22 transmits the generated control command to wireless base station RB in a wireless manner.

Wireless base station RB receives a radio signal containing the control command and forwards this control command to remote camera RC via wired LAN 40.

Remote camera RC includes camera 32, biaxial pan head 33, wired communication section 31, controller 30, and preset memory 30*m*; herein, preset memory 30*m* acts as a storage unit.

Camera 32 captures an image of a subject and has a zoom function. Biaxial pan head 33 supports camera 32 and can biaxially control a pan and tilt. Wired communication section 31 receives a control command. Controller 30 controls a zoom of camera 32 and a pan and tilt of biaxial pan head 33, based on the received control command. Controller 30 performs this control by referring to preset memory 30*m*, which stores, in advance, control information regarding a pan, tilt, and zoom (referred simply below as "control information") for each of preset points Pn positioned immediately below beacon signal transmission apparatuses Bn; the control information is associated with numbers n assigned to beacon signal transmission apparatuses Bn (or beacon signals).

Figure 3:
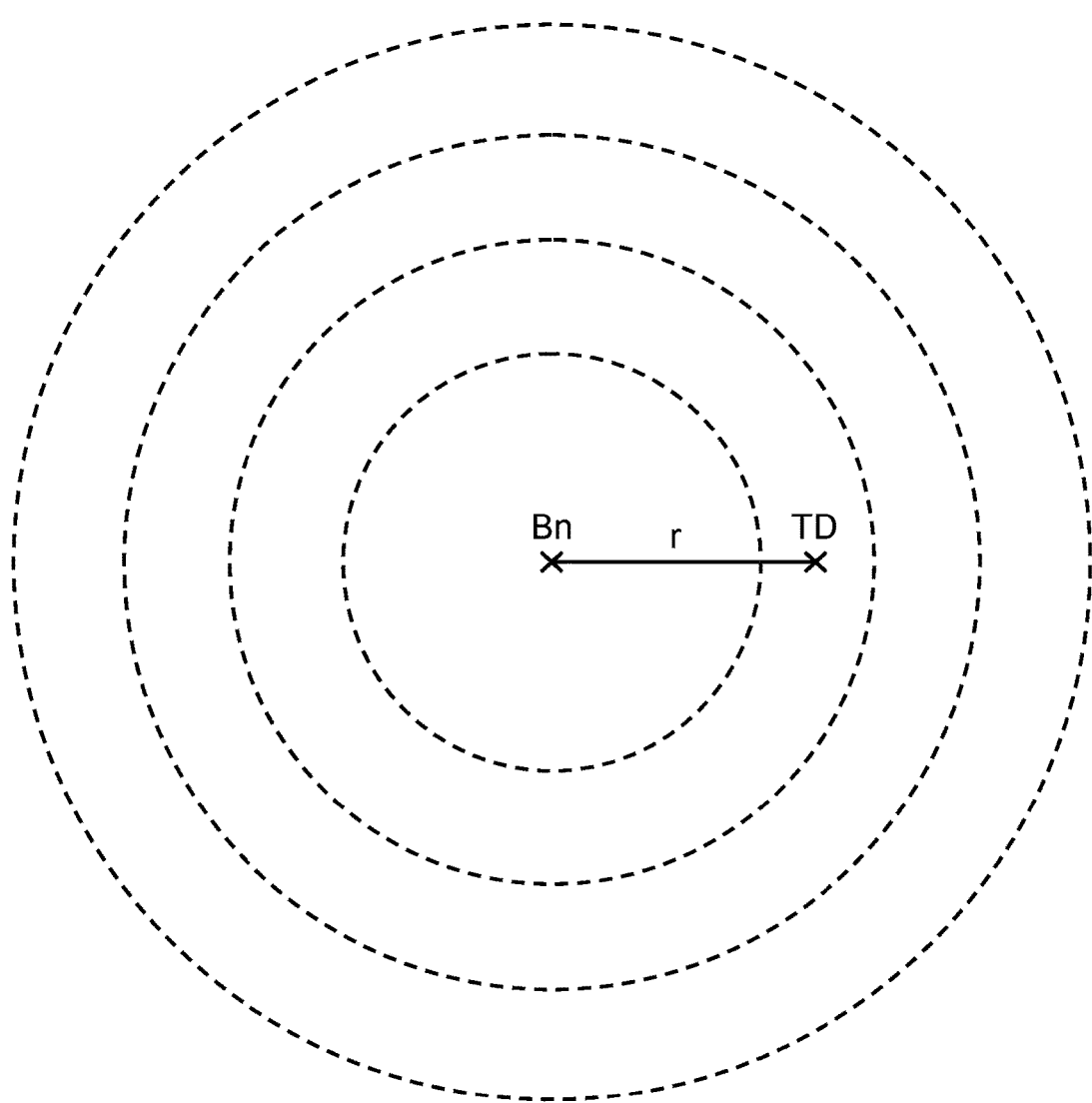
FIG. 3 is a plan view used to explain a distance measuring method according to the first exemplary embodiment.

FIG. 3 is a plan view used to explain a distance measuring method according to the first exemplary embodiment.

In FIG. 3, each beacon signal transmission apparatus Bn uses a non-directional antenna, for example, to always transmit a beacon signal formed of a weak continuous electromagnetic wave having a concentric pattern. If a weak electromagnetic wave of 10 mW or less is used, for example, propagation characteristics of the electromagnetic wave can be utilized. More specifically, the propagation characteristics in which a reception intensity of the beacon signal attenuates more rapidly as a distance from beacon signal transmission apparatus Bn increases can be utilized. In this way, the distances can be estimated with high precision. More specifically, for example, each beacon signal transmission apparatus Bn may emit beacon signals in conformity with the standard of a beacon signal released by Apple Inc. This standard conforms to the specifications "Bluetooth (registered trademark) 4.0 Low Energy (BLE)", which are called "iBeacon (registered trademark)". Many smartphones support the BLE; so, distances r can highly precisely be estimated utilizing this characteristic.

As described above, tag device TD can estimate distances between tag device TD and beacon signal transmission apparatuses Bn, based on reception intensities of received beacon signals.

Figure 4:
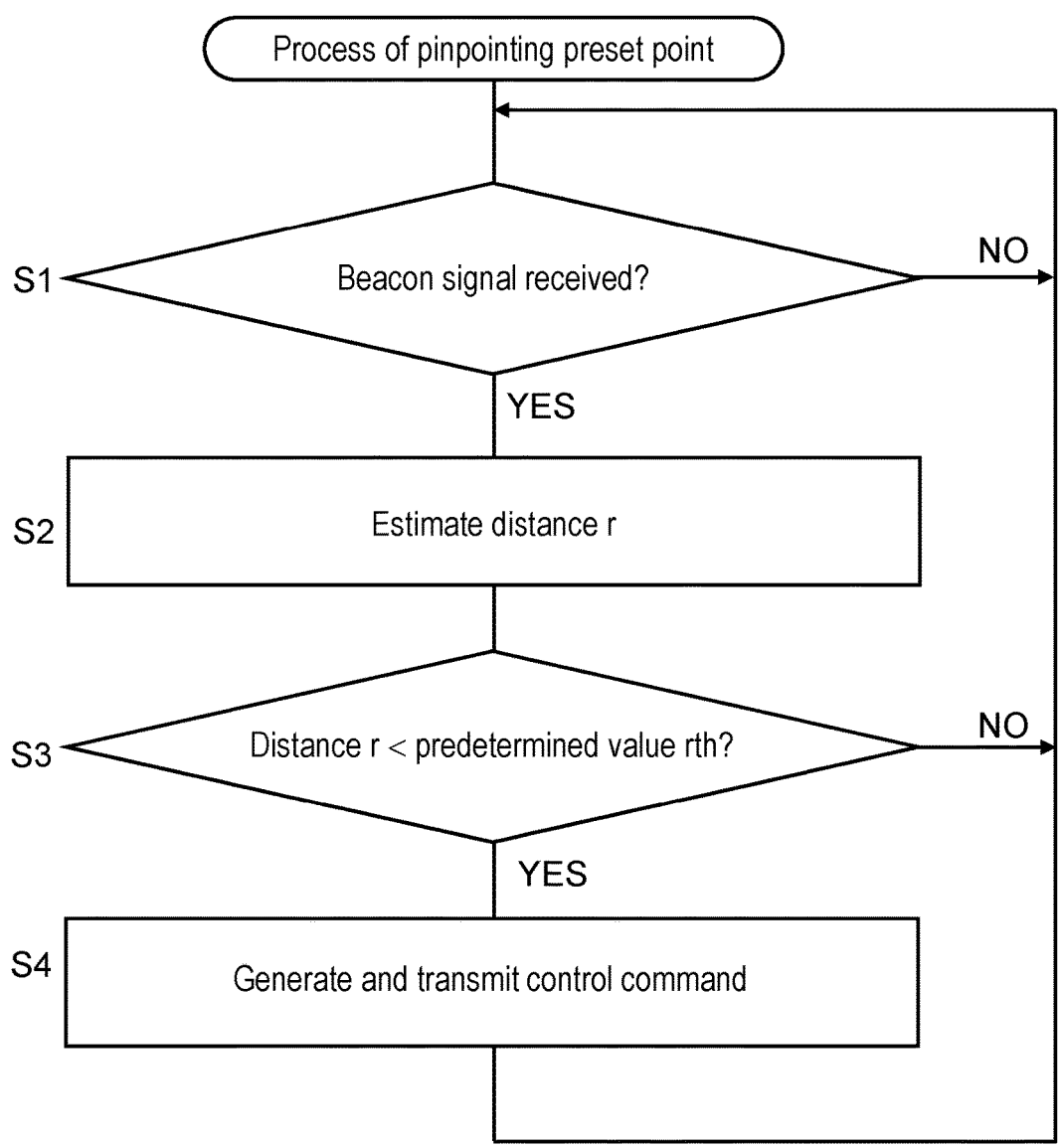
FIG. 4 is a flowchart of a process of pinpointing a preset point according to the first exemplary embodiment.

FIG. 4 is a flowchart of a process of pinpointing a preset point according to the first exemplary embodiment. In this exemplary embodiment, preset memory 30*m* of remote camera RC stores, in advance, control information regarding an N number of preset points Pn respectively corresponding to an N number of beacon signal transmission apparatuses Bn. Tag device TD transmits a control command (number n assigned to beacon signal transmission apparatus Bn or a beacon signal) to remote camera RC. The remote camera controls camera 32 to face preset point Pn corresponding to any given number n, based on the control information regarding this number n.

As illustrated in FIG. 4 and FIG. 1, in step S1, controller 10 determines whether beacon signals from individual beacon signal transmission apparatuses Bn have been received. In the case of YES, the processing proceeds to step S2; in the case of NO, the processing returns to step S1. In step S2, distance determination section 11 estimates distances r between tag device TD and beacon signal transmission apparatuses Bn, based on reception intensities of the received beacon signals. In step S3, distance determination section 11 determines whether the shortest one of estimated distances r is less than the predetermined value rth. In the case of YES, the processing proceeds to step S4; in the case of NO, the processing returns to step S1. Herein, the predetermined value rth is a distance threshold. More specifically, the predetermined value rth is a distance threshold used to detect the presence of subject 50 (see FIG. 2) at or close to preset point Pn.

In step S4, preset control command generation section 12 generates a control command (number n assigned to beacon signal transmission apparatus Bn or the beacon signal) that causes remote camera RC to face preset point Pn immediately below beacon signal transmission apparatus Bn having the shortest distance r. Then, wireless communication section 22 transmits the control command to wired communication section 31 of remote camera RC via wireless base station RB and wired LAN 40, after which the processing returns to step S1.

After step S4, controller 30 of remote camera RC receives, from wired communication section 31, the control command (number n assigned to beacon signal transmission apparatus Bn or the beacon signal), which causes remote camera RC to change its orientation. In response to this, controller 30 searches preset memory 30m by using number n as a retrieval key to obtain information regarding a pan, tilt, and zoom at preset point Pn. Then, controller 30 controls biaxial pan head 33 so that camera 32 faces preset point Pn, based on the control information regarding a pan and tilt. In addition, controller 30 controls camera 32, based on the control information regarding a zoom.

The control program for performing the process of pinpointing a preset point in FIG. 4 may be a control program in an application for the electronic device, for example if tag device TD is an electronic device, such as a smartphone.

According to this exemplary embodiment, as described above, when preset points Pn at which an image of subject 50 is to be captured are known, a camera system can track subject 50 with a simple configuration and with high precision compared to a conventional art, thereby causing remote camera RC to automatically follow a movement of subject 50. Thus, the camera system does not require a cameraperson and an operator. In addition, the camera system can achieve a flexible, smooth camerawork and enables even a remote camera that has already been installed to automatically follow a movement of a subject. This camera system exerts the specific effect that an existing smartphone can be used as tag device TD.

Although distance determination section 11 and preset control command generation section 12 are provided in tag device TD in this exemplary embodiment, distance determination section 11 and preset control command generation section 12 may be provided in remote camera RC instead. In this case, wireless communication section 22 of tag device TD may transmit information regarding reception intensities of beacon signals to a remote camera via wireless base station RB. Then, remote camera RC may estimate distances and generate a control command, which are required to cause camera 32 to face a preset point.

Although preset memory 30m is provided in remote camera RC in this exemplary embodiment, preset memory 30m may be provided in tag device TD instead. In this case, tag device TD may obtain control information regarding a pan, tilt, and zoom that causes camera 32 to face preset point Pn. Then, wireless communication section 22 of tag device TD may transmit control information to remote camera RC via wireless base station RB.

In short, one or both of remote camera RC and tag device TD in this exemplary embodiment may include distance determination section 11, preset control command generation section 12, and preset memory 30m.

Second Exemplary Embodiment

Figure 5:
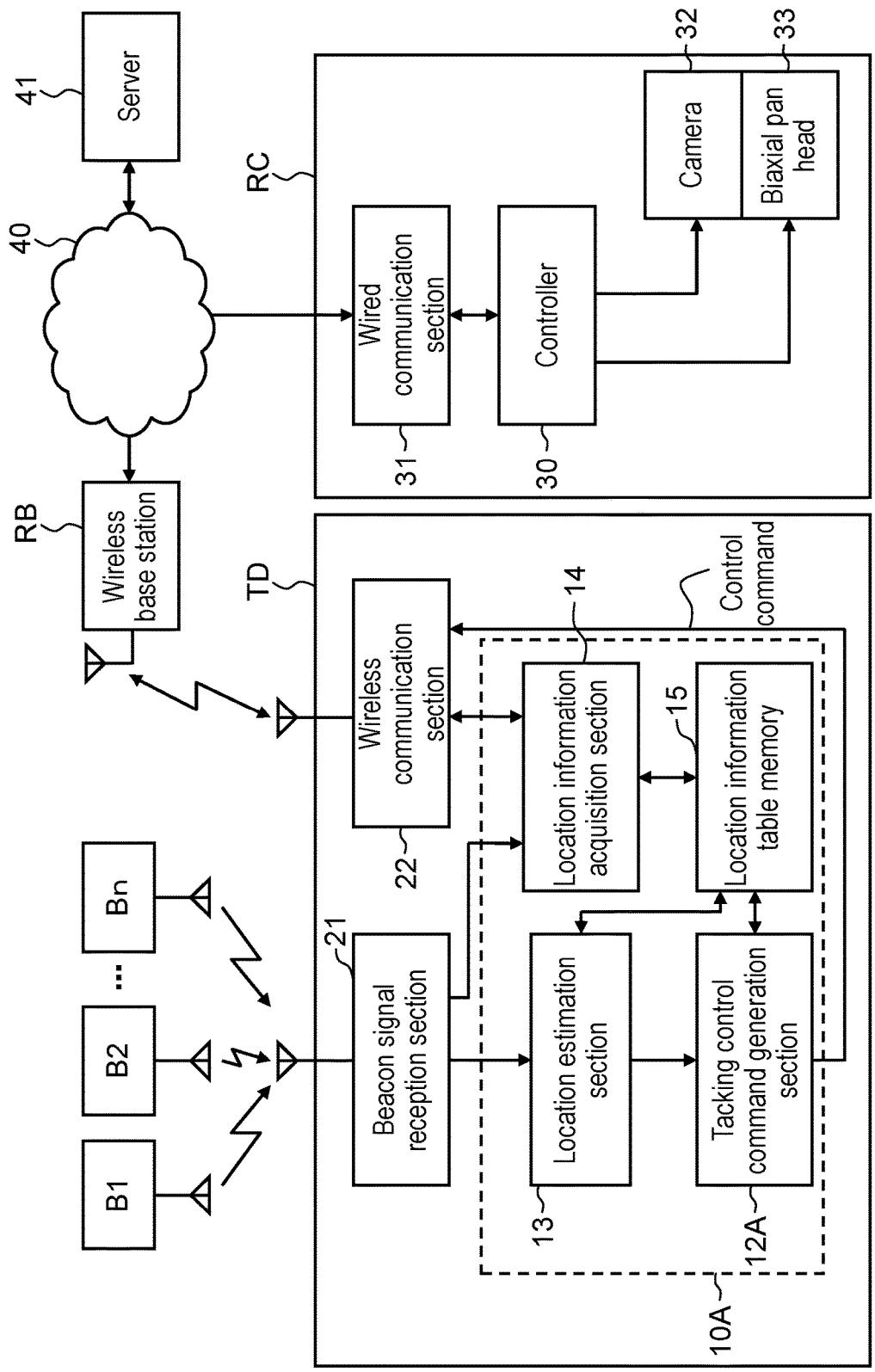
FIG. 5 is a block diagram illustrating a configuration of a camera system according to a second exemplary embodiment.
Figure 6:
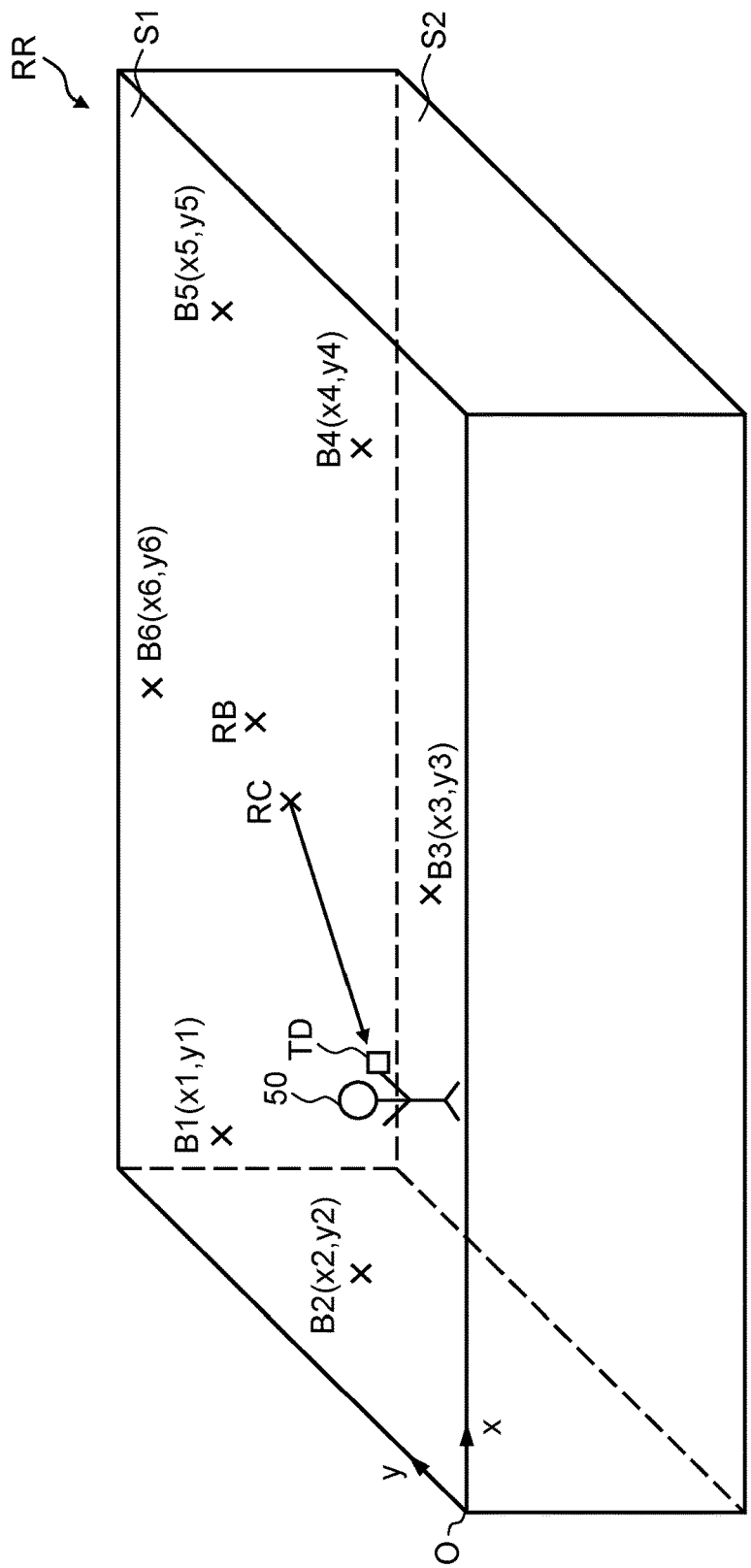
FIG. 6 is a schematic view used to explain the camera system according to the second exemplary embodiment.

FIG. 5 is a block diagram illustrating a configuration of a camera system according to a second exemplary embodiment. FIG. 6 is a schematic view used to explain the camera system according to the second exemplary embodiment. The camera system according to the second exemplary embodiment differs from the camera system according to the first exemplary embodiment in FIG. 1 in providing features (1) to (4) described below.

(1) Remote camera RC does not include preset memory 30m. Controller 30 controls camera 32 and biaxial pan head 33, based on control information regarding a pan, tilt, and zoom which is contained in a control command transmitted from tag device TD. Herein, the control command contains the control information regarding a pan, tilt, and zoom, which causes remote camera RC to face subject 50.

(2) As can be seen from the comparison between FIG. 6 and FIG. 2, preset points Pn and preset floor points Qn are not set in the second exemplary embodiment.

(3) Controller 10A is provided instead of controller 10. Controller 10A includes location estimation section 13 instead of distance determination section 11. Controller 10A includes tracking control command generation section 12A that generates a tracking control command as an exemplary control command, instead of preset control command generation section 12. Controller 10A further includes location information acquisition section 14 and location information table memory 15.

(4) Server 41 (or a cloud) is provided, which stores: IDs assigned to beacon signals (e.g., numbers n assigned to beacon signal transmission apparatuses Bn or beacon signals, or a letter string for identifying room RR); and location information regarding remote camera RC and beacon signal transmission apparatuses Bn.

Differences from the first exemplary embodiment will be described below.

In FIG. 5, location information acquisition section 14 stores the location information regarding remote camera RC and beacon signal transmission apparatuses Bn in location information table memory 15. The location information may be obtained in advance or may be obtained from server 41 over wired LAN 40 (or a network connected to tag device TD) through a process of searching for a beacon signal in FIG. 9 which will be described later. Location estimation section 13 estimates a location (two-dimensional coordinates) of tag device TD, based on: locations of at least three beacon signal transmission apparatuses Bn arranged a predetermined distance away from one another; and distances from the at least three beacon signal transmission apparatuses Bn which are estimated from the reception intensities of their beacon signals (details of an estimation method will be described later). Tracking control command generation section 12A generates a tracking control command that causes camera 32 to face subject 50 (see FIG. 6) having tag device TD, based on the estimated location of tag device TD and the coordinates of the location of remote camera RC within location information table memory 15. Then, tracking control command generation section 12A transmits the tracking control command to remote camera RC, thereby controlling camera 32 to face subject 50.

Figure 7:
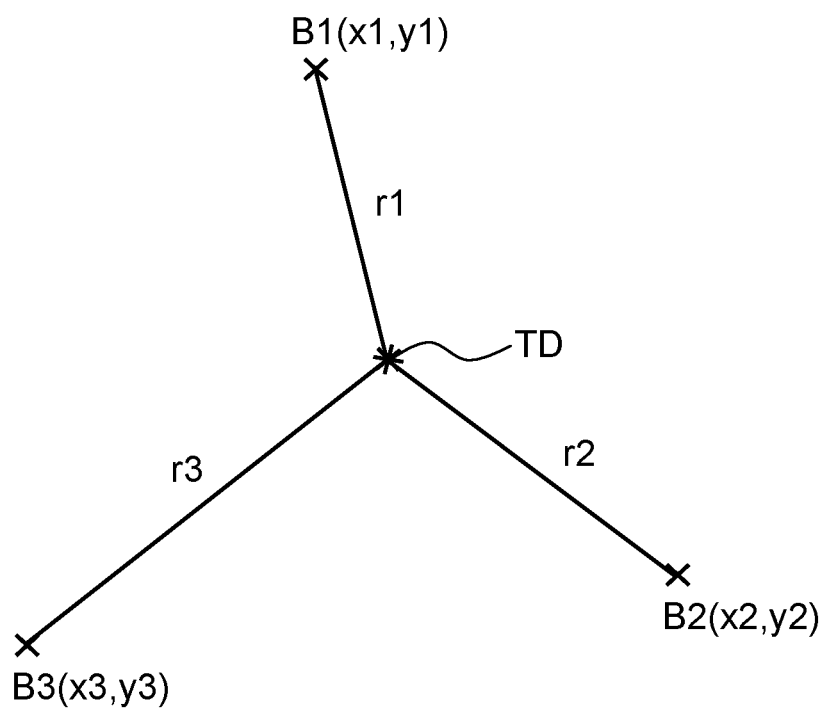
FIG. 7 is a plan view used to explain a location-measuring method according to the second exemplary embodiment.

FIG. 7 is a plan view used to explain a location-measuring method according to the second exemplary embodiment. In FIG. 7, for example coordinates of locations of beacon signal transmission apparatuses B1, B2, B3 are expected to be known as described below:

B1 (x1, y1);
B2 (x2, y2);
B3 (x3, y3).

The distances between beacon signal transmission apparatuses B1, B2, B3 and tag device TD are respectively denoted by r1, r2, r3.

If distances between the at least three beacon signal transmission apparatuses B1, B2, and B3 and tag device TD are known, coordinates (x, y) of tag device TD can be calculated. For example, the formula of known trilateration may be used to calculate coordinates, although other formulae may be used instead.

Figure 8:
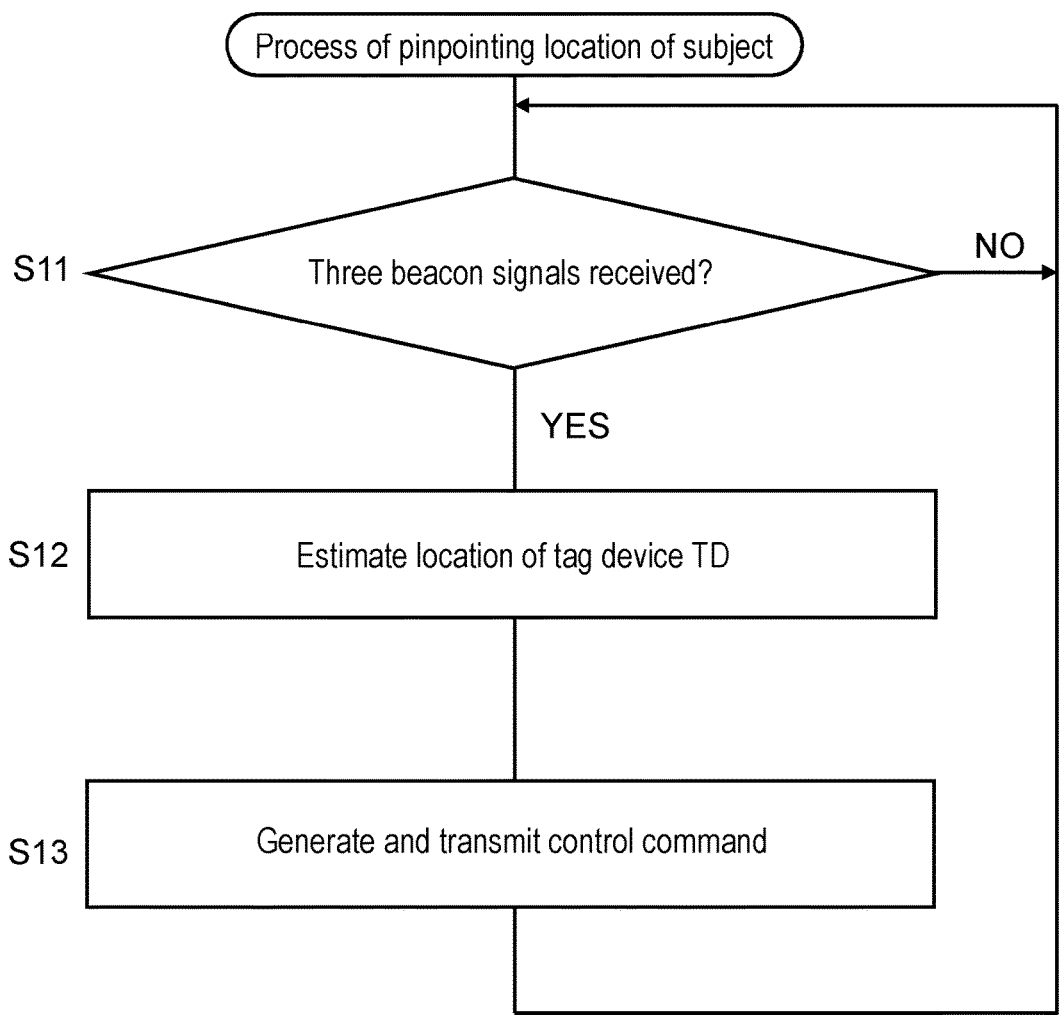
FIG. 8 is a flowchart of a process of pinpointing a location of a subject according to the second exemplary embodiment.

FIG. 8 is a flowchart of a process of pinpointing a location of a subject according to the second exemplary embodiment.

As illustrated in FIG. 8 and FIG. 5, in step S11, controller 10A determines whether three beacon signals from three beacon signal transmission apparatuses Bn have been received. In the case of YES, the processing proceeds to step S12; in the case of NO, the processing returns to step S11. In step S12, location estimation section 13 estimates distances between tag device TD and three beacon signal transmission apparatuses Bn, based on the reception intensities of the received beacon signals. Then, location estimation section 13 estimates a location of tag device TD, based on the three estimated distances. In step S13, tracking control command generation section 12A generates a control command that causes remote camera RC to face the estimated location of tag device TD. Then, wireless communication section 22 transmits the control command to wired communication section 31 of remote camera RC via wireless base station RB and wired LAN 40, after which the processing returns to step S11. Herein, the control command containing control information regarding a pan, tilt, and zoom may be, for example a control command for tracking subject 50 (see FIG. 6) so as to capture an image of the whole of subject 50.

After step S13, controller 30 of remote camera RC receives, from wired communication section 31, the control command that changes an orientation of remote camera RC. Then, controller 30 controls biaxial pan head 33 based on the control information regarding a pan and tilt in the received control command, so that camera 32 faces the coordinates of the location of tag device TD. In addition, controller 30 controls camera 32 so as to be able to capture an image of the whole of subject 50 (see FIG. 6) having tag device TD, based on the control information regarding a zoom in the received control command.

The control program for performing the process of pinpointing a location of a subject in FIG. 8 may be a control program in an application for the electronic device, for example if tag device TD is an electronic device, such as a smartphone.

In this exemplary embodiment, if beacon signal reception section 21 can simultaneously detect at least three beacon signals, location estimation section 13 estimates coordinates of a location of tag device TD, based on distances rn between three beacon signal transmission apparatuses Bn and tag device TD. Then, wireless communication section 22 transmits a control command to remote camera RC so as to face tag device TD. In this way, remote camera RC can capture an image of subject 50 having tag device TD while tracking subject 50.

If beacon signal reception section 21 detects four or more beacon signals, location estimation section 13 may select the three beacon signals from the received electromagnetic waves in decreasing order of their reception intensity and then may use the selected beacon signals for location estimation. Alternatively, location estimation section 13 may estimate a location of tag device TD by means of weighting using parameters according to distances from four or more beacon signal transmission apparatuses Bn, as will be described later as a modification with reference to FIG. 11.

Figure 9:
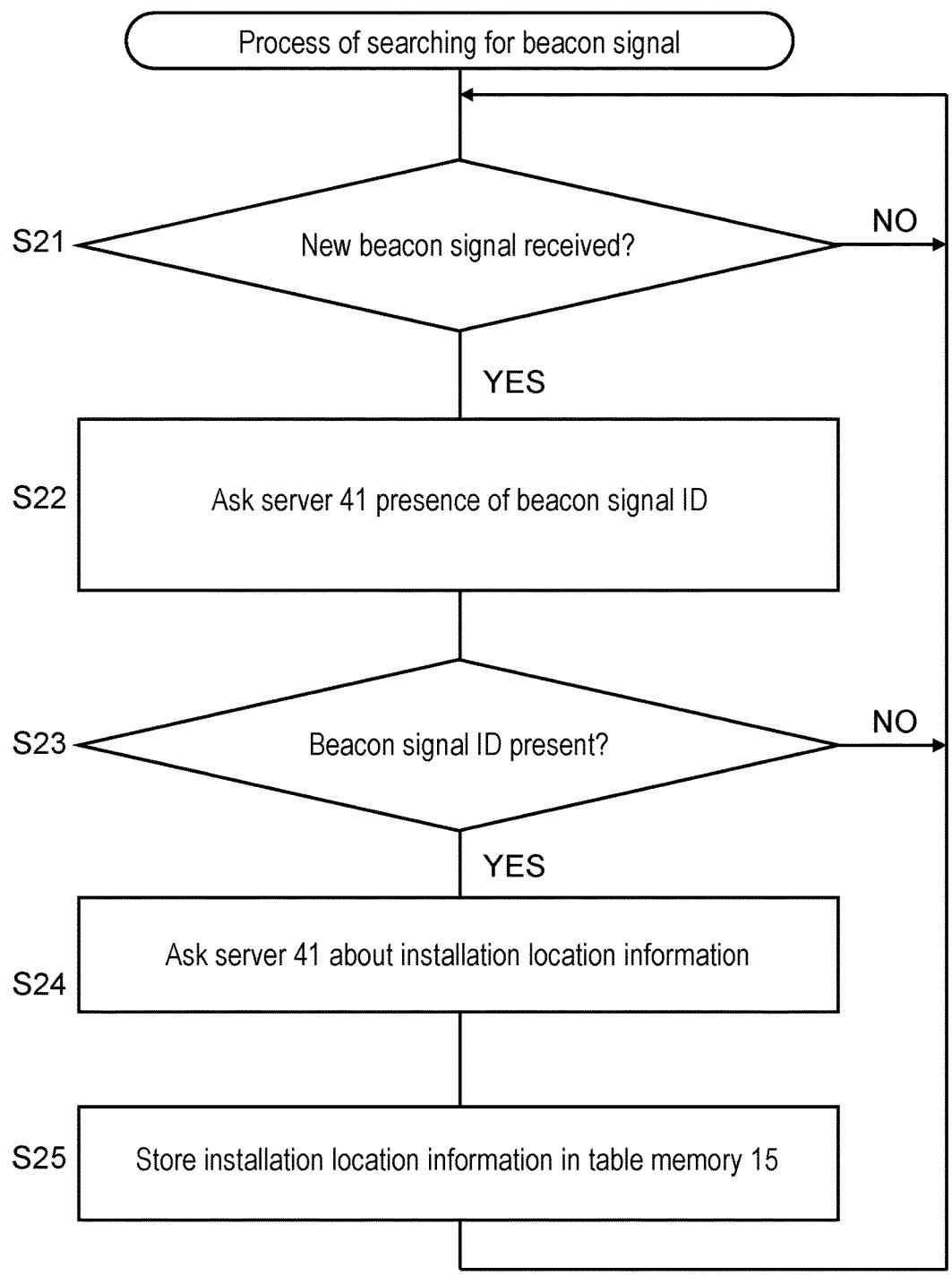
FIG. 9 is a flowchart of a process of searching for a beacon signal according to the second exemplary embodiment.

FIG. 9 is a flowchart of a process of searching for a beacon signal according to the second exemplary embodiment.

(A) A plurality of rooms RR having different sizes are present, and remote camera RC and a plurality of beacon signal transmission apparatuses Bn inside one of rooms RR are disposed at different locations from those inside another of rooms RR.

(B) A plurality of rooms RR having the same size are present, and remote camera RC and a plurality of beacon signal transmission apparatuses Bn inside one of rooms RR are disposed at different locations from those inside another of rooms RR.

In the case (A) or (B), if the location information regarding all beacon signal transmission apparatuses Bn is stored in tag device TD in advance, the memory capacity of tag device TD may be insufficient.

Therefore, a configuration in which a process of searching for a beacon signal is performed as illustrated in FIG. 9 can be conceived of. In the process of searching for a beacon signal, for example:

(I) when tag device TD is switched on;
(II) when tag device TD is reset;
(III) when a timing that appears at preset intervals comes; or
(IV) when tag device TD enters room RR via the entry, tag device TD identifies room RR from the ID of a beacon signal and obtains location information regarding room RR. More specifically, tag device TD obtains location information regarding remote camera RC and a plurality of beacon signal transmission apparatuses Bn from server 41 over wired LAN 40 (or cloud), based on the ID of a received beacon signal. When subject 50 approaches beacon signal transmission apparatus Bn in the vicinity of the entry, tag device TD may obtain the ID of the beacon signal.

As illustrated in FIG. 9 and FIG. 5, in step S21, controller 10A determines whether a new beacon signal has been received. In the case of YES, the processing proceeds to step S22; in the case of NO, the processing returns to step S21. In step S22, location information acquisition section 14 obtains the beacon signal ID from the beacon signal received by beacon signal reception section 21. Then, location information acquisition section 14 asks server 41 whether the beacon signal ID is present, via wireless communication section 22, wireless base station RB, and wired LAN 40. In step S23, location information acquisition section 14 determines whether the beacon signal ID is present in server 41, based on the answer from server 41. In the case of YES, the processing proceeds to step S24; in the case of NO, the processing returns to step S21. In step S24, location information acquisition section 14 asks server 41 about information regarding the installation locations of beacon signal transmission apparatus Bn corresponding to the beacon signal ID and remote camera RC. In step S25, location information acquisition section 14 obtains, from server 41, information regarding the installation locations of remote camera RC and beacon signal transmission apparatus Bn. Then, location information acquisition section 14 stores the installation location information in location information table memory 15, after which the processing returns to step S21.

The control program for performing the process of searching for a beacon signal in FIG. 9 may be a control program in an application for the electronic device, for example if tag device TD is an electronic device, such as a smartphone.

Through the process of searching for a beacon signal in FIG. 9, it is possible to obtain, from server 41, location information regarding beacon signal transmission apparatus Bn corresponding to an ID and remote camera RC. As a result, location information can be modified inside server 41, and therefore a plurality of tag devices TD do not have to perform any update process.

According to this exemplary embodiment, as described above, even when preset points Pn at which an image of subject 50 is to be captured are unknown, a camera system can estimate distances between tag device TD and beacon signal transmission apparatuses Bn, based on the reception intensities of at least three beacon signals. Thus, camera system can estimate a location of tag device TD and can control remote camera RC by generating a control command for remote camera RC based on the estimated location. Consequently, it is possible to point remote camera RC at subject 50 while tracking subject 50 with a simple configuration and with high precision compared to a conventional art.

If an area in which subject 50 is movable is one of two areas separated by a straight line connecting two beacon signal transmission apparatuses B1, B2, the camera system may estimate a location (two-dimensional coordinates) of tag device TD only from two beacon signal transmission apparatuses B1, B2. This can apply to an exemplary case in which two beacon signal transmission apparatuses are disposed horizontally inside room RR near a wall with a space therebetween.

If subject 50 moves only in a linear manner, the camera system may estimate a location (two-dimensional coordinates) of tag device TD from a single beacon signal transmission apparatus B1. This can apply to an exemplary case in which a subject reciprocates on a rail, a corridor, for example.

In the above cases, a camera system can cause remote camera RC to automatically track subject 50 without necessarily having to use three beacon signal transmission apparatuses, as opposed to this exemplary embodiment.

Third Exemplary Embodiment

Figure 10:
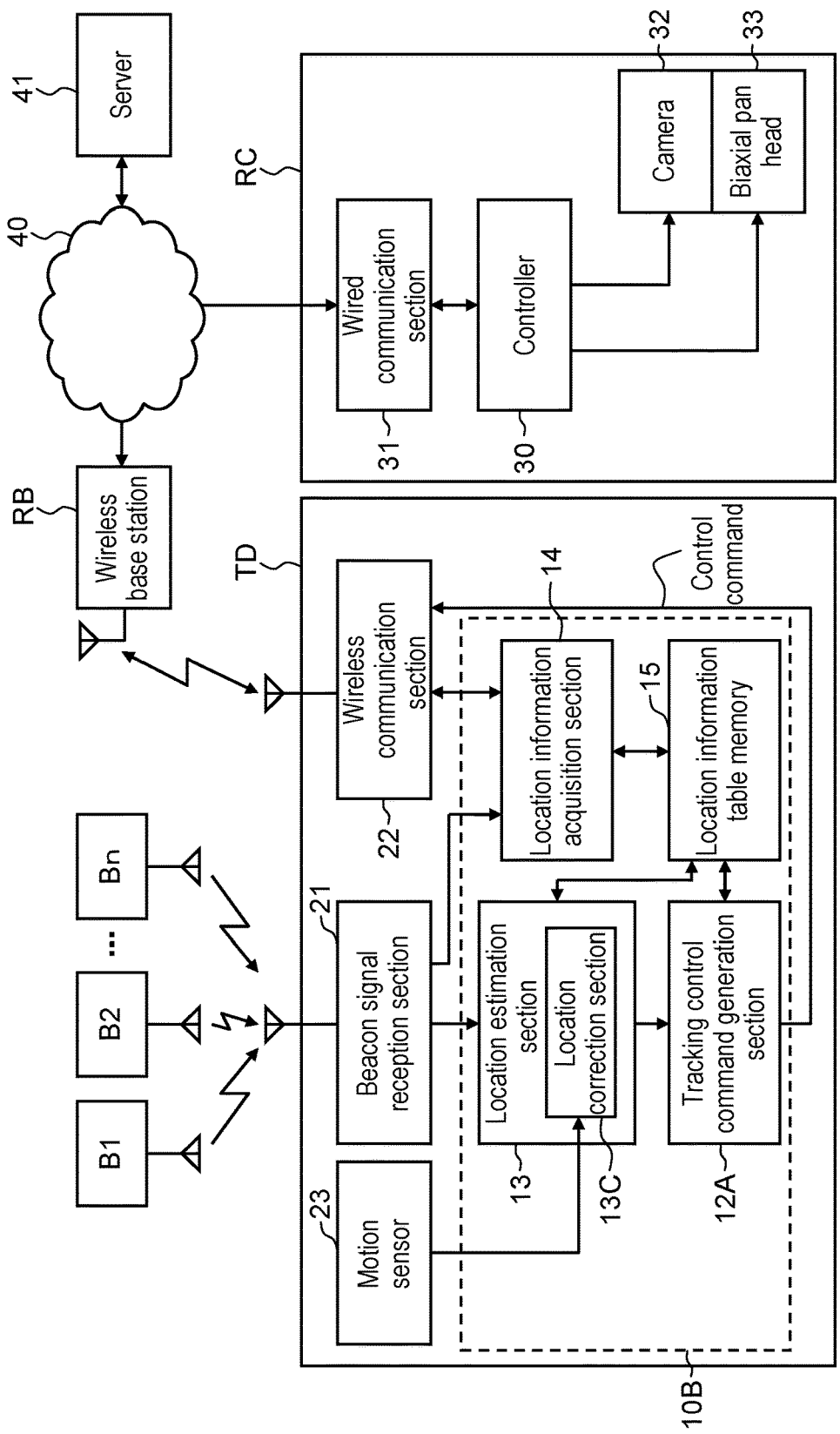
FIG. 10 is a block diagram illustrating a configuration of a camera system according to a third exemplary embodiment.

FIG. 10 is a block diagram illustrating a configuration of a camera system according to a third exemplary embodiment. The camera system according to the third exemplary embodiment in FIG. 10 differs from the camera system according to the second exemplary embodiment in FIG. 5 in providing features (1) and (2) described below.
(1) Motion sensor 23 is provided, which measures acceleration, a rotational angle (by a gyroscope), an earth's magnetism, etc. of tag device TD in order to detect a motion signal of tag device TD.
  Herein, motion sensor 23 can measure acceleration, a rotational angle (by using a gyroscope), an earth's magnetism, etc. on x, y, z axes with high precision and at high frequencies. The motion signal detected by motion sensor 23 contains an integration error accumulated with time. Therefore, the motion sensor is used to correct an error accumulated for a short period of time when a method for detecting a location from beacon signals is used.
(2) Controller 10B is provided instead of controller 10A.
  Location estimation section 13 further includes location correction section 13C that corrects coordinates of a location of tag device TD which have been estimated by location estimation section 13, based on the motion signal from motion sensor 23.

Differences from the second exemplary embodiment will be described below.

In FIG. 10, motion sensor 23 detects a motion signal, and then location correction section 13C uses information in the motion signal detected by motion sensor 23 to correct a location estimated based on the reception intensities of beacon signals.

Even if precision of location estimation based on beacon signals is insufficient, location estimation section 13 uses the information in the motion signal in preference to determine that subject 50 is stationary unless a motion signal detected by motion sensor 23 is fluctuated. This scheme can apply to an exemplary case in which tag device TD is stationary but subject 50 is estimated to move due to fluctuations of intensities of beacon signals.

More specifically, there is a known technique (pedestrian dead reckoning) for detecting the number of footsteps and a moving direction with motion sensor 23 to autonomously calculate a movement locus. First, location estimation section 13 uses this technique to estimate, based on beacon signals, a location of subject 50 moving over a long period of time, which is equal to or longer than one second. Then, location estimation section 13 uses, as a reference, the location of subject 50 estimated based on beacon signals to correct the location of subject 50 moving over a short period of time, which is shorter than one second, in accordance with a movement locus calculated with autonomous navigation of motion sensor 23.

Figure 11:
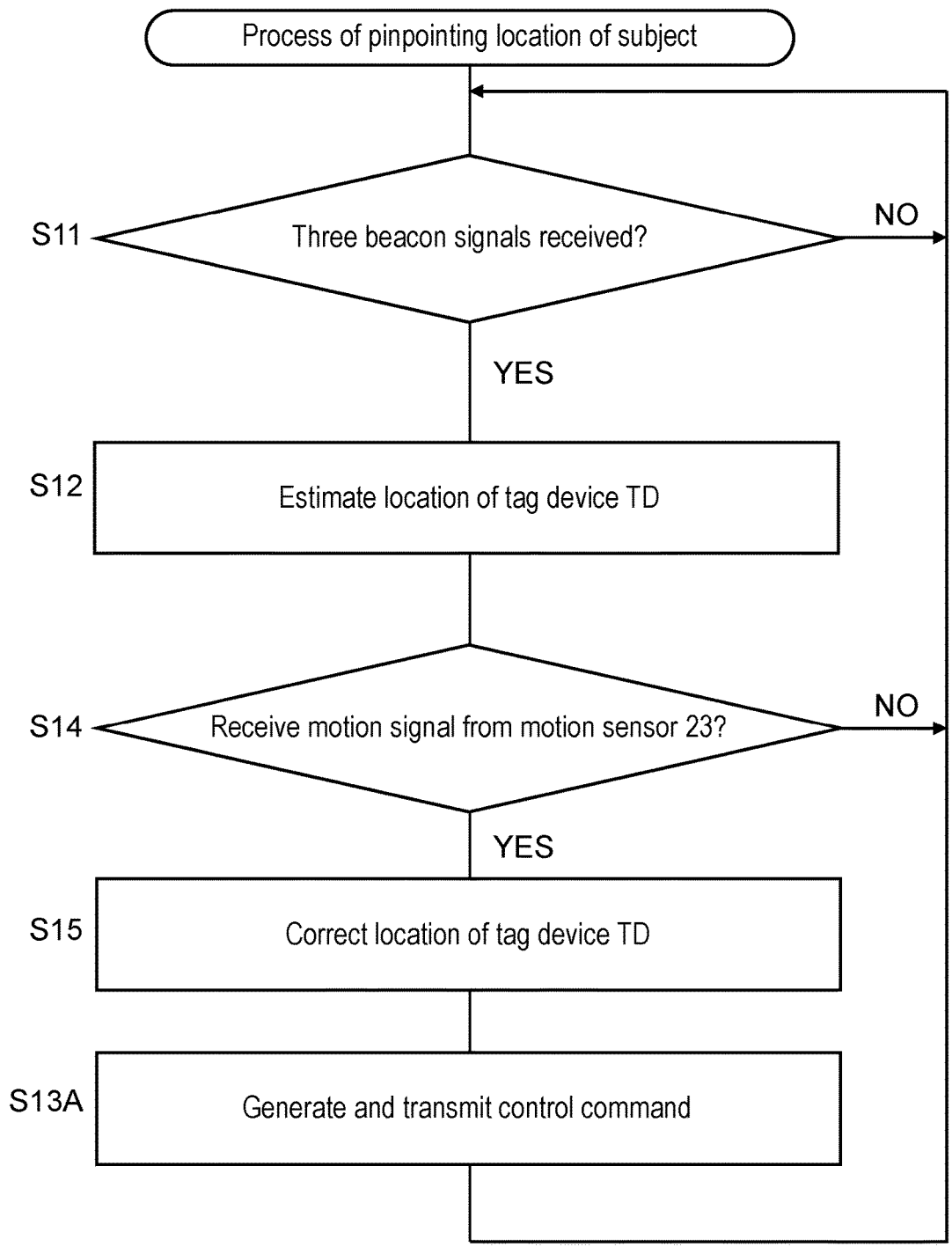
FIG. 11 is a flowchart of a process of pinpointing a location of a subject according to the third exemplary embodiment.

FIG. 11 is a flowchart of a process of pinpointing a location of a subject according to the third exemplary embodiment.

In FIG. 11 and FIG. 10, in step S11, controller 10B determines whether three beacon signals from three beacon signal transmission apparatuses Bn have been received. In the case of YES, the processing proceeds to step S12; in the case of NO, the processing returns to step S11. In step S12, location estimation section 13 estimates distances rn between tag device TD and three beacon signal transmission apparatuses Bn, based on the reception intensities of the three beacon signals. Then, location estimation section 13 estimates a location of tag device TD, based on the three estimated distances rn. In step S14, location estimation section 13 determines whether a motion signal from motion sensor 23 has been received. In the case of YES, the processing proceeds to step S15; in the case of NO, the processing returns to step S11. In step S15, location correction section 13C corrects the location of tag device TD, based on information in the motion signal from motion sensor 23. In step S13A, tracking control command generation section 12A generates a control command, which causes remote camera RC to point subject 50 at the estimated or corrected location of tag device TD. Then, wireless communication section 22 transmits the control command to wired communication section 31 of the remote camera RC via wireless base station RB and wired LAN 40.

After step S13A, controller 30 of remote camera RC receives the control command that changes an orientation of remote camera RC from wired communication section 31. Then, controller 30 controls biaxial pan head 33 so that camera 32 faces the coordinates of the location of tag device TD, based on the control information regarding a pan and tilt in the received control command. Furthermore, controller 30 controls camera 32 so as to be able to capture an image of the whole of subject 50 (see FIG. 6) having tag device TD, based on the control information regarding a zoom in the received control command.

The control program for performing the process of pinpointing a location of a subject in FIG. 11 may be a control program in an application for the electronic device, for example if tag device TD is an electronic device, such as a smartphone.

According to this exemplary embodiment, as described above, a camera system not only can estimate a location of tag device TD as in the second exemplary embodiment but also can correct the location of tag device TD based on a motion signal from motion sensor 23. Therefore, the camera system can automatically point remote camera RC at subject 50 while tracking subject 50 with precision higher than that of the second exemplary embodiment.

As described above, the first to third exemplary embodiments have been described as exemplary techniques disclosed in this application. However, the techniques of the present disclosure are not limited to these exemplary embodiments; therefore, the techniques of the present disclosure are applicable to various exemplary embodiments undergoing appropriate modifications, substitutions, additions, and omissions. Moreover, novel exemplary embodiments including a combination of some of the components described in the foregoing first to third exemplary embodiments are possible.

Some other exemplary embodiments will be described below.

In the foregoing first to third exemplary embodiments, at least one or a plurality of beacon signal transmission apparatuses Bn and remote cameras RC are installed inside a room RR of indoor facility illustrated in FIG. 2 and FIG. 6. However, the present disclosure is not limited to these exemplary embodiments and is also applicable to an exemplary embodiment in which at least one or a plurality of beacon signal transmission apparatuses Bn and remote cameras RC are installed within a limited outdoor area.

In the foregoing first to third exemplary embodiments, a smartphone is used as an exemplary electronic device; however, the electronic device in the present disclosure is not limited to a smartphone. Other examples of an electronic device include a portable telephone, a music player, and a personal computer.

Referring to FIG. 2, the camera system according to the foregoing first exemplary embodiment pinpoints preset point Pn, based on distances between beacon signal transmission apparatuses Bn and a tag device. As described with reference to FIG. 6, both the camera systems according to the foregoing second exemplary embodiment and third exemplary embodiment measure a location of subject 50, based on distances between beacon signal transmission apparatuses Bn and tag device TD. However, the present disclosure is not limited to these schemes and may employ measuring methods (1) to (5) described below:

(1) IMES (Indoor MEssaging System) measurement: measuring a location of subject 50 within an indoor room by using a signal transmitted from a dedicated apparatus;
(2) Wi-Fi (registered trademark) measurement: measuring a location of subject 50 from, for example the field intensities or arrival times of electromagnetic waves transmitted from a plurality of Wi-Fi access points;
(3) Base station measurement: measuring a location of subject 50 based on directions and delay times of responses to presence confirmation signals transmitted at regular intervals from a base station for portable phones;
(4) Sound wave measurement: a transmitter transmits an ultrasonic wave that humans cannot hear, and then a microphone picks up this ultrasonic wave, measuring a location of subject 50; and
(5) Visible light measurement: an illumination device, such as an LED, sends a signal by blinking light so quickly that humans cannot perceive it, and a location of subject 50 is measured using this signal.

The foregoing second exemplary embodiment and third exemplary embodiment employ a configuration in which tag device TD is provided with controller 10A or controller 10B. However, remote camera RC may be provided with the whole or a part of controller 10A or controller 10B.

Figure 12:
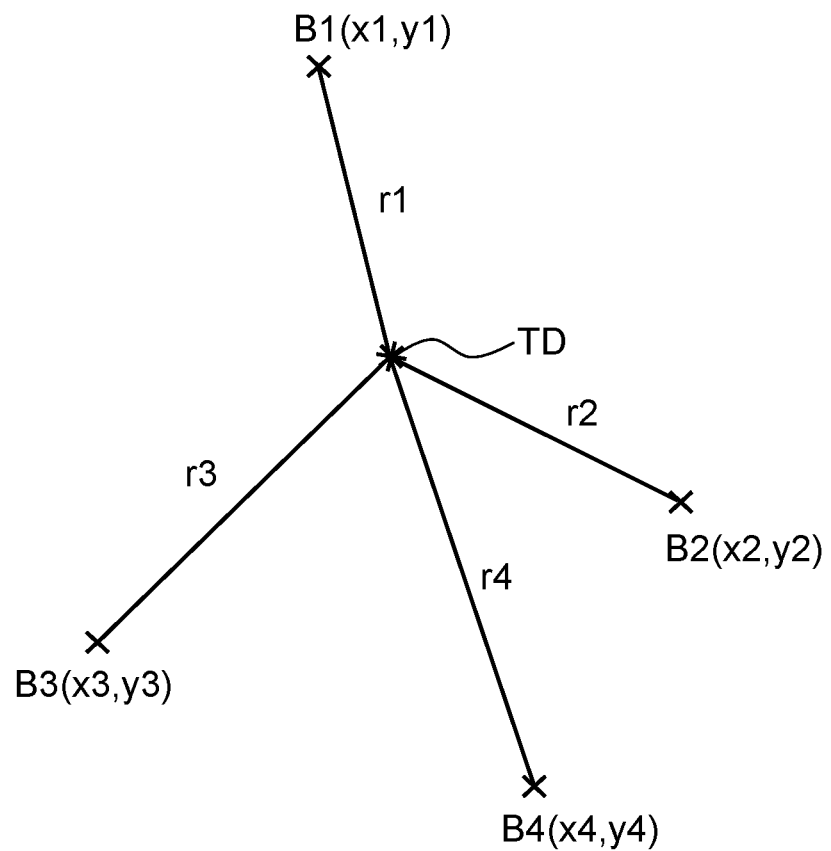
FIG. 12 is a plan view used to explain a location-measuring method according to a modification.

FIG. 12 is a plan view used to explain a location-measuring method according to a modification.

In FIG. 12, for example, coordinates of locations of beacon signal transmission apparatuses B1, B2, B3, B4 are expected to be known as described below:

B1 (x1, y1);
B2 (x2, y2);
B3 (x3, y3); and
B4 (x4, y4).

Distances between beacon signal transmission apparatuses B1, B2, B3, B4 and tag device TD are denoted by r1, r2, r3, r4.

A description will be given below of a method for estimating a location of tag device TD by means of weighting using parameters according to the distances based on four or more beacon signals, with reference to FIG. 12. More specifically, a description will be given in the case where four beacon signals are received from four beacon signal transmission apparatuses Bn.

Four combinations of three beacon signal transmission apparatuses Bn selected from among the four beacon signal transmission apparatuses Bn will be listed below;
(1) Coordinates of a location of tag device TD estimated based on set A (B1, B2, B3) are denoted by (xa, ya);
(2) Coordinates of a location of tag device TD estimated based on set B (B2, B3, B4) are denoted by (xb, yb);
(3) Coordinates of a location of tag device TD estimated based on set C (B3, B4, B1) are denoted by (xc, yc); and
(4) Coordinates of a location of tag device TD estimated based on set D (B4, B1, B2) are denoted by (xd, yd).

When coordinates of a location of tag device TD estimated based on three beacon signals are calculated using a formula of trilateration, these coordinates are estimated to have four values described below. For example, average distance Ra of set A is determined from a root mean square value of distances between tag device TD and three beacon signal transmission apparatuses B1, B2, B3 of set A. In addition, average distances Rb, Rc, Rd of sets B, C, D are determined likewise.

$$Ra = \sqrt{r1^2 + r2^2 + r3^2} \qquad (1)$$

$$Rb = \sqrt{r2^2 + r3^2 + r4^2} \qquad (2)$$

$$Rc = \sqrt{r3^2 + r4^2 + r1^2} \quad (3)$$

$$Rd = \sqrt{r4^2 + r1^2 + r2^2} \quad (4)$$

Coordinates (x, y) of a location of tag device TD based on the above average distances Ra, Rb, Rc, Rd can be calculated in the following manner.

$$x = \frac{\frac{xa}{Ra} + \frac{xb}{Rb} + \frac{xc}{Rc} + \frac{xd}{Rd}}{\frac{1}{Ra} + \frac{1}{Rb} + \frac{1}{Rc} + \frac{1}{Rd}} \quad (5)$$

$$y = \frac{\frac{ya}{Ra} + \frac{yb}{Rb} + \frac{yc}{Rc} + \frac{yd}{Rd}}{\frac{1}{Ra} + \frac{1}{Rb} + \frac{1}{Rc} + \frac{1}{Rd}} \quad (6)$$

The modification described above uses a method for estimating coordinates (x, y) of a location of tag device TD by means of weighting using parameters according to distances based on four beacon signals. However, the present disclosure is limited to this method and may employ a method for estimating coordinates (x, y) of a location of tag device TD by means of weighting using parameters according to distances based on five or more beacon signals.

As described above, the exemplary embodiments have been described as exemplary techniques of the present disclosure. For that purpose, the accompanying drawings and the detailed description are provided.

Consequently, among the components described in the accompanying drawings and the detailed descriptions, there are possibly included not only essential components for solving the problem, but also other inessential components for solving the problem which are used only for the exemplification of the techniques described above. For this reason, it should not be acknowledged that these inessential components are considered to be essential only on the grounds that these inessential components are described in the accompanying drawings and/or the detailed descriptions.

Since the foregoing exemplary embodiments are exemplary technique of the present disclosure, the exemplary embodiments can undergo various modifications, substitutions, additions, and omissions within the scope of the claims or their equivalents.

As described in detail, the present disclosure is applicable to a camera system that can capture an image of a subject moving within an indoor room or a limited outdoor area by automatically tracking the subject and to a method for controlling this camera system. Moreover, the present disclosure is applicable to an electronic device, such as a smartphone, that controls the above camera system and to a control program for this electronic device.

What is claimed is:

1. A camera system that automatically points a remote camera at a subject possessing an electronic device, the camera system comprising:
   the remote camera;
   one or more beacon signal transmission apparatuses, each of which transmits a beacon signal; and
   the electronic device that receives the beacon signals,
   one or both of the remote camera and the electronic device including:
   a location estimation section that estimates distances between the electronic device and the beacon signal transmission apparatuses, based on reception intensities of the beacon signals and that estimates a location of the electronic device, based on the estimated distances and locations of the beacon signal transmission apparatuses; and
   a control command generation section that generates a control command that causes the remote camera to face the subject, based on the estimated location of the electronic device and a location of the remote camera, wherein
   the electronic device receives at least four of the beacon signals from at least four of the beacon signal transmission apparatuses,
   the electronic device selects a plurality of beacon signal sets from at least four of the beacon signals, each of the beacon signals sets including three beacon signals,
   the electronic device calculates an average of at least four distances between the electronic device and the beacon signal transmission apparatuses for each of the beacon signals sets, based on the reception intensities of the three selected beacon signals of each of the beacon signals sets, and
   the electronic device estimates a location of the electronic device, based on the average of the four calculated distances.

2. The camera system according to claim 1, wherein
   the electronic device further includes a motion sensor that generates a motion signal of the electronic device, and
   the electronic device corrects the estimated location of the electronic device, based on the motion signal from the motion sensor.

3. The camera system according to claim 1, wherein
   the electronic device or the remote camera pinpoints the locations of the beacon signal transmission apparatuses and a location of the remote camera, based on location information stored in the electronic device or the remote camera or based on location information obtained from a server or a cloud to which the electronic device or the remote camera is connected via a network.

4. The camera system according to claim 1, wherein
   the control command contains control information regarding a pan, tilt, and zoom, the control information causing the remote camera to face the subject.

5. An electronic device in a camera system that automatically points a remote camera at a subject, the electronic device being possessed by the subject, the electronic device comprising:
   a beacon signal reception section that receives beacon signals transmitted from one or more beacon signal transmission apparatuses;
   a location estimation section that estimates distances between the electronic device and the beacon signal transmission apparatuses, based on reception intensities of the beacon signals and that estimates a location of the electronic device, based on the estimated distances and locations of the beacon signal transmission apparatuses; and
   a control command generation section that, generates a control command that causes the remote camera to face the subject, based on the estimated location of the electronic device and a location of the remote camera, wherein
   the electronic device receives at least four of the beacon signals from at least four of the beacon signal transmission apparatuses,
   the electronic device selects a plurality of beacon signal sets from at least four of the beacon signals, each of the beacon signals sets including three beacon signals, the electronic device calculates an average of at least four distances between the electronic device and the beacon signal transmission apparatuses for each of the beacon signals sets, based on the reception intensities of the three selected beacon signals of each of the beacon signals sets, and the electronic device estimates a location of the electronic device, based on the average of the four calculated distances.

6. The electronic device according to claim 5, further comprising a motion sensor that generates a motion signal of the electronic device, wherein the electronic device corrects the estimated location of the electronic device, based on the motion signal from the motion sensor.

7. The electronic device according to claim 5, wherein the locations of the beacon signal transmission apparatuses and the location of the remote camera are given in advance to the electronic device or are obtained by the electronic device from a server or a cloud connected to a network to which the electronic device is connected.

8. The electronic device according to claim 5, wherein the control command contains control information regarding a pan, tilt, and zoom, the control information causing the remote camera to face the subject.

* * * * *